(12) United States Patent
Gao

(10) Patent No.: US 10,304,201 B2
(45) Date of Patent: May 28, 2019

(54) ITEM IMAGE STITCHING FROM MULTIPLE LINE-SCAN IMAGES FOR BARCODE SCANNING SYSTEMS

(71) Applicant: Datalogic ADC, Inc., Eugene, OR (US)

(72) Inventor: WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 41 days.

(21) Appl. No.: 15/199,471

(22) Filed: Jun. 30, 2016

(65) Prior Publication Data

US 2018/0005392 A1   Jan. 4, 2018

(51) Int. Cl.
*G06T 7/00*    (2017.01)
*G06T 7/33*    (2017.01)
*G06T 3/00*    (2006.01)
*G06T 3/40*    (2006.01)
*H04N 5/28*    (2006.01)
*G06T 7/32*    (2017.01)
*H04N 5/235*   (2006.01)

(52) U.S. Cl.
CPC .......... *G06T 7/337* (2017.01); *G06T 3/0068* (2013.01); *G06T 3/4038* (2013.01); *G06T 7/32* (2017.01); *H04N 5/28* (2013.01); *G06T 2207/20221* (2013.01); *H04N 5/2358* (2013.01)

(58) Field of Classification Search
None
See application file for complete search history.

(56) References Cited

U.S. PATENT DOCUMENTS

2016/0088287 A1* 3/2016 Sadi ................ H04N 19/54
                                               348/43
2017/0178372 A1* 6/2017 Gormish ............. G06T 11/60

* cited by examiner

*Primary Examiner* — Delomia L Gilliard
(74) *Attorney, Agent, or Firm* — Dentons US LLP

(57) ABSTRACT

One embodiment of a system and method for imaging items may include storing at least one lookup table that includes position data of multiple image regions, where the position data provides relative positions of the image regions. An item may be moved to pass through the image regions. Image data of the item may be imaged as the item passes through a plurality of the image regions. The position data may be applied to the captured respective image data from each of the image regions through which the item passed to form a set of stitching image data that is substantially aligned with one another. The set of stitching image data may be stitched to form a composite image of the item.

20 Claims, 10 Drawing Sheets

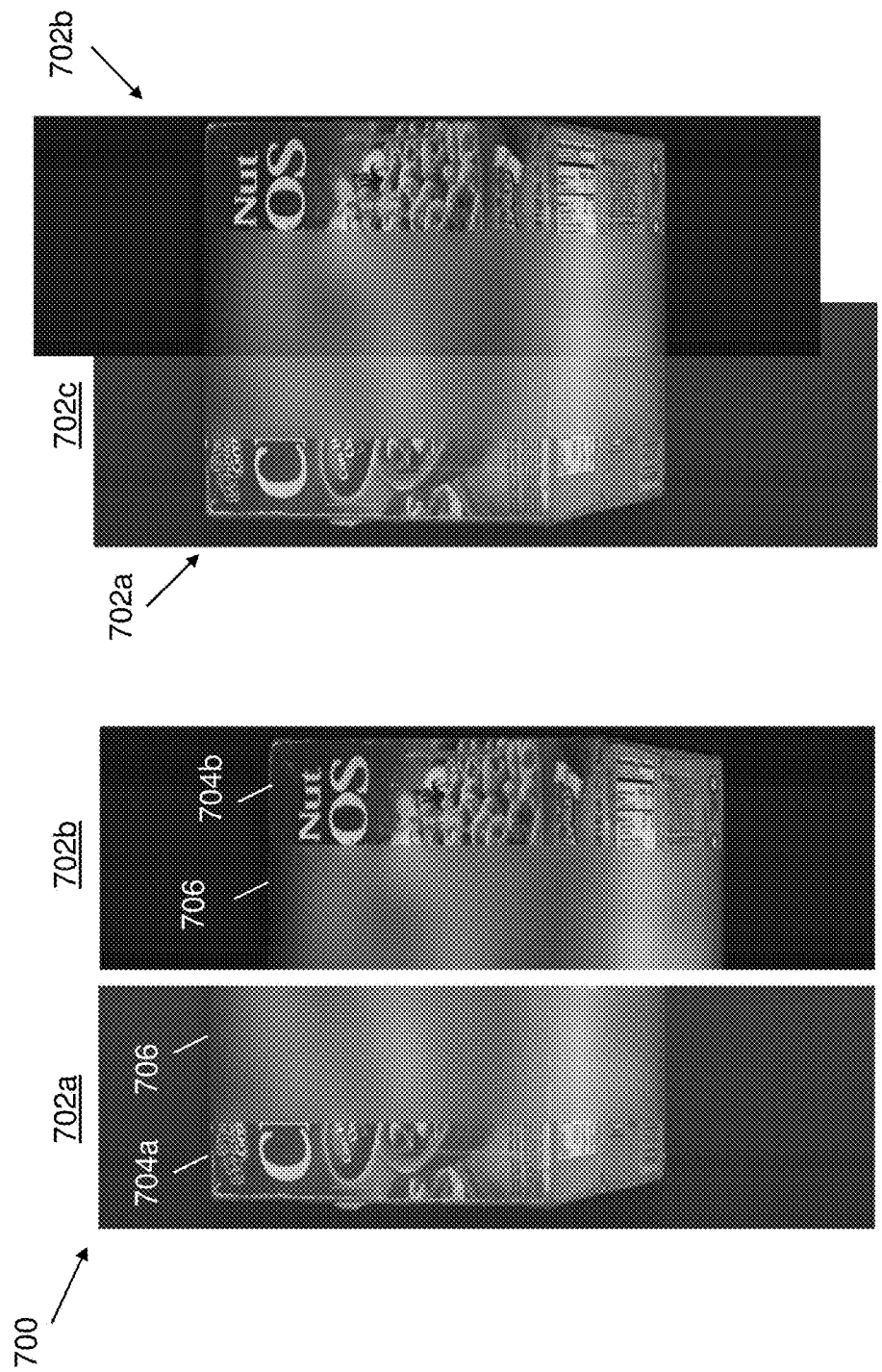

ITEM IMAGE STITCHING FROM MULTIPLE LINE-SCAN IMAGES FOR BARCODE SCANNING SYSTEMS

BACKGROUND

Barcode scanning and other imaging systems, such as defect quality control systems, that use one large view to capture an entire item, such as product packaging, may use one or more cameras, typically a high-resolution line scan camera (e.g., 8192 pixels). However, these cameras are expensive because of the high-resolution optics and other high-quality camera characteristics. In the event of using multiple barcode reading cameras or cameras that capture smaller portions of the large objects, image stitching may be performed. Conventional image stitching uses image processing to match features, such as writing or other markings, on the items to align the images captured by each camera. As understood in the art, stitching images is computationally time-consuming and expensive. Moreover, such image processing may be a limiting factor for high-speed object processing, such as manufactured products being moved on high-speed conveyor belts at rates of about 1 m/s to about 2 m/s, for example.

With regard to FIG. 1, an illustration of a prior art image stitching process that includes image data 100 of a scene that includes a set of illustrative line scans 102a and 102b (collectively 102) is shown. The capture of two line scans 102 in this case is performed by an area image sensor reading out multiple lines or multiple shorter linear image sensors that may be used rather than a single image sensor capable of capturing the entire scene that is a much more expensive solution. The line scans 102a and 102b are conventionally image processed for stitching the two line scans 102 together using image processing of features within the line scans 102a and 102b. As an example, image processing may identify a common imaged feature, such as the letter "e" 104a in line scan 102a and the letter "e" 104b in line scan 102b. Other common imaged features may be utilized for the stitching process, as well. The line scans 102a and 102b may be stitched by using an image feature stitching process 106 to align the common imaged features 104a and 104b, as shown by the stitched image 108. In the stitched image 108, two grayscale levels 110a and 110b show where the two line scans 102a and 102b were stitched. In one embodiment, the two grayscale levels 110a and 110b may result from different illumination being measured and using two different cameras.

SUMMARY

To overcome the shortcomings of imaging systems that perform barcode scanning or other image processing, one or more cameras that include an image sensor that may be defined into subsets of image pixels that capture different portions of a scene may be utilized. Optical devices, such as mirrors, lenses, or otherwise may be used to image a portion of the scene (e.g., a certain distance, such as about 7.5 inches, along an X or latitudinal direction of a conveyer belt that is typically 18-24 inches wide) onto respective subsets of the image pixels. As an example, two, three, four, or any other number of scene portions may be captured by an area image sensor separated into multiple views or by multiple cameras with respective image sensors. Usually these types of barcode scanning systems have item dimension measurement sub-systems, either included in the system or a separated device before a scanning station or portal with known item dimension and relative line scan view locations on the belt by calibration plus the time each line image is captured (i.e., the time stamp of each image sensor exposure/integration). Rather than using conventional feature stitching (i.e., matching common features in a scene in the images captured by the respective subsets of pixels of the image sensor, a lookup table including relative position data between line scans captured by the different subsets of pixels may be utilized. In one embodiment, each subset of pixels may have an associated lookup table with the possible exception of one subset of pixels not having an associated lookup table due to being defined as a reference or baseline line scan. In an alternative embodiment, a single lookup table may include each of the position relational data for the two or more line scans or scan areas associated with the subset of pixels. To stitch images together, the images captured by each of the subsets of pixels may be offset and/or re-oriented without having to image process (e.g., align) imaged features in the data.

One embodiment of a system for imaging items may include a camera including a plurality of imaging pixels, at least one optical element configured and positioned to cause at least two subsets of the imaging pixels to capture respective image regions, and a conveyer belt configured to move an item in front of the camera. A non-transitory memory may be configured to store at least one lookup table that includes position data of the image regions, where the position data provides relative positions of the image regions. A processing unit may be in communication with the camera and non-transitory memory, and be configured to (i) capture line image data of an item from each of the subsets of imaging pixels, (ii) apply the position data to the captured respective image data from each of the respective subsets of imaging pixels to form a set of stitching image data that is substantially aligned with one another, and (iii) stitch the set of stitching image data to form a composite image of the item.

A method for imaging items may include storing at least one lookup table that includes position data of multiple image regions, where the position data provides relative positions of the image regions. The position data may be determined through a calibration process that determines the position data. An item may be moved to pass through the image regions. Image data of the item may be imaged as the item passes through a plurality of the image regions. The position data may be applied to the captured respective image data from each of the image regions through which the item passed to form a set of stitching image data that is substantially aligned with one another. The set of stitching image data may be stitched to form a composite image of the item.

BRIEF DESCRIPTION OF THE DRAWINGS

Illustrative embodiments of the present invention are described in detail below with reference to the attached drawing figures, which are incorporated by reference herein and wherein:

FIGS. 7A-7C are illustration of a verification process 700 that show that the stitching process described herein operates without matching common imaged features;

DETAILED DESCRIPTION OF THE DRAWINGS

Figure 2:
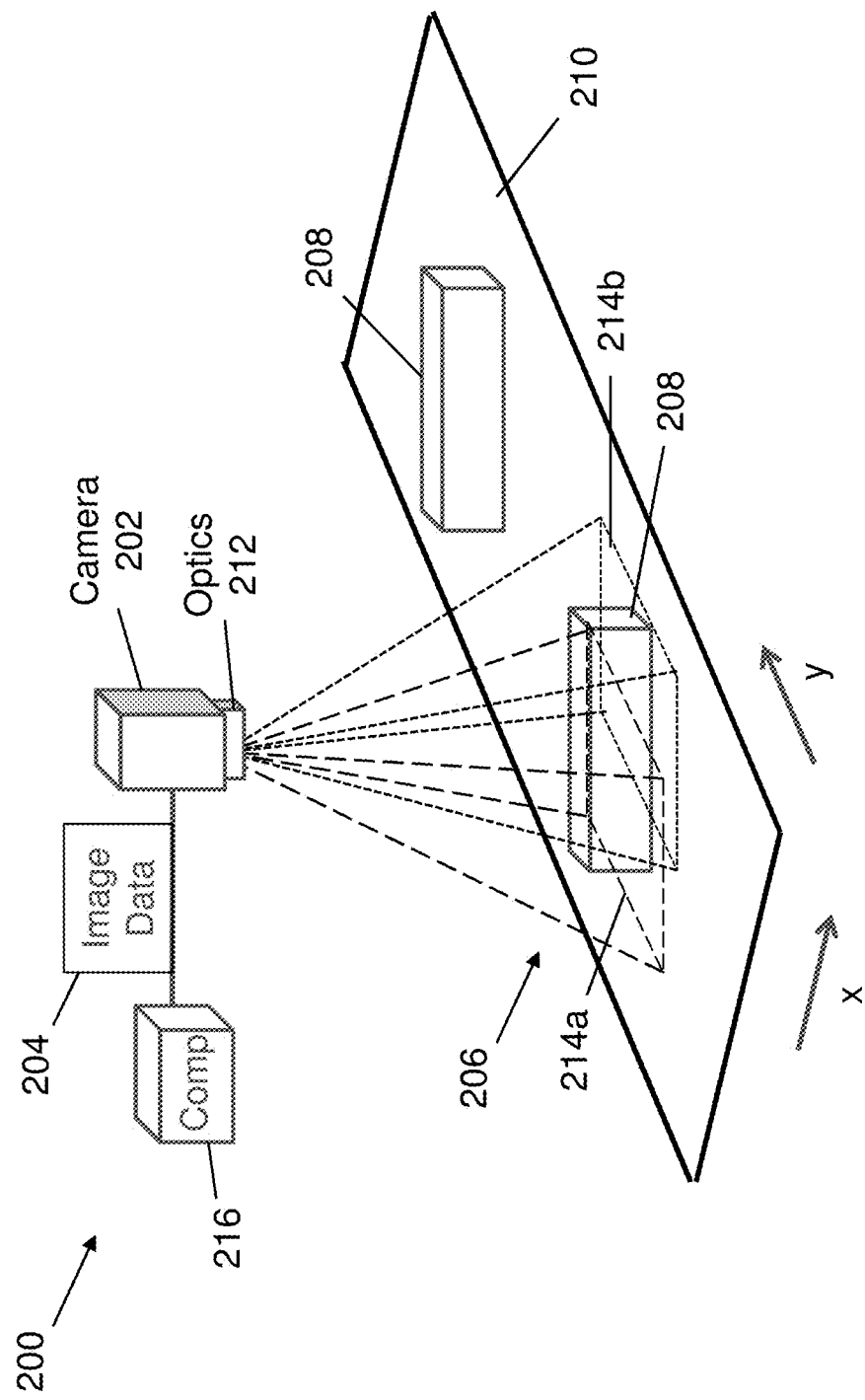
FIG. 2 is an illustration of an illustrative item processing system in which a camera may be configured to capture images to produce image data of a scene through which items or objects with common height may be moved by conveyor belt.

With regard to FIG. 2, an illustration of an illustrative item processing system 200 in which a camera 202 may be configured to capture images to produce image data 204 of a scene 206 through which items or objects 208 with known height in a z-axis may be moved by conveyor belt 210 is shown. The item processing system 200 may be a barcode scanning system or other image processing system, such as a product inspection system. The items 208 being of known height, may also be common sized, including having substantially the same lengths, widths, and heights. Although the objects 208 are shown to be substantially identical, different sized objects may be processed, but common height objects may be commonly processed due to the system 200 having to perform image alignment in the x-direction, as further described herein. The items 208 may be moved by a conveyer belt 210 or other moving system (e.g., robots).

The camera 202 may include a multi-pixel image sensor (see FIG. 3) that may be configured to collect scene images and generate the image data 204. In one embodiment, one or more optical elements 212 may be configured and oriented to cause different portions 214a and 214b (collectively 214) of the scene 206 to be imaged onto the image sensor of the camera 202. As an example, the different image portions 214 may be different linear portions along an x-axis that extends horizontally across the conveyer belt 210.

The image data 204 captured by the camera 202 may be communicated to a computer system 216 for processing thereby. As further described herein, the processing of the image data 204 may include stitching the image data 204 (e.g., successive scan lines) without processing imaged features in the image data 204. The image data 204 may be collected in multiple image streams depending on a number of line scans captured in the image portions 214 used to capture images across the conveyer belt 210, as further described with respect to FIG. 3.

Although the system 200 of FIG. 2 shows a single camera 202, multiple cameras may be utilized. If multiple cameras are utilized, then the cameras or image portions being captured thereby are to be aligned and calibrated with respect to one another and optionally synchronized in time. By aligning and synchronizing, image data captured by the respective cameras may be stitched by using lookup tables, as further described herein. If multiple cameras are used, respective optical device(s) may be utilized to image portions of a scene onto one or more portions of the respective sensors in the same or similar manner as shown in FIG. 2.

Figure 1:
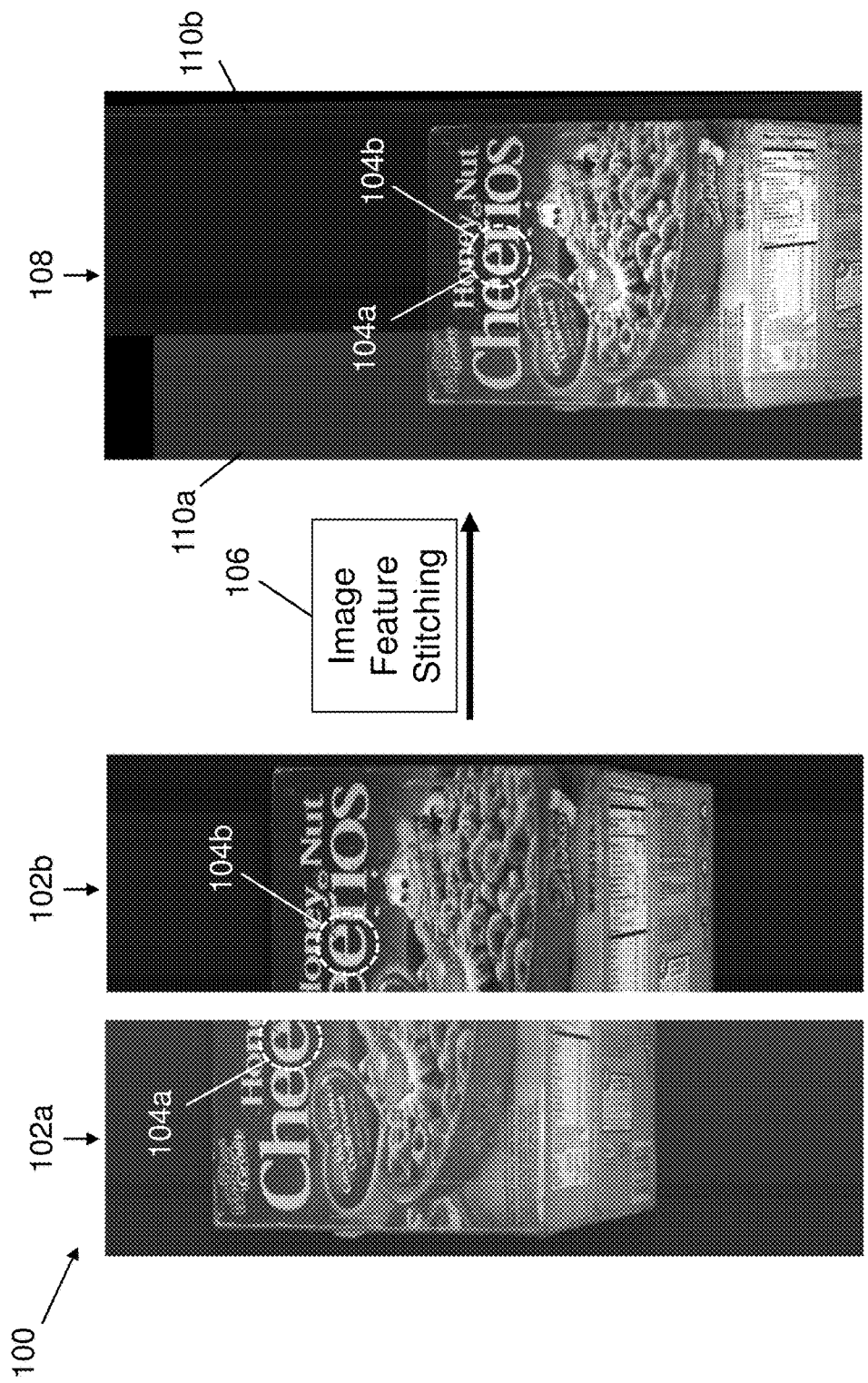
FIG. 1 is an illustration of a prior art image stitching process that includes image data of a scene that includes a set of illustrative line scans.
Figure 3:
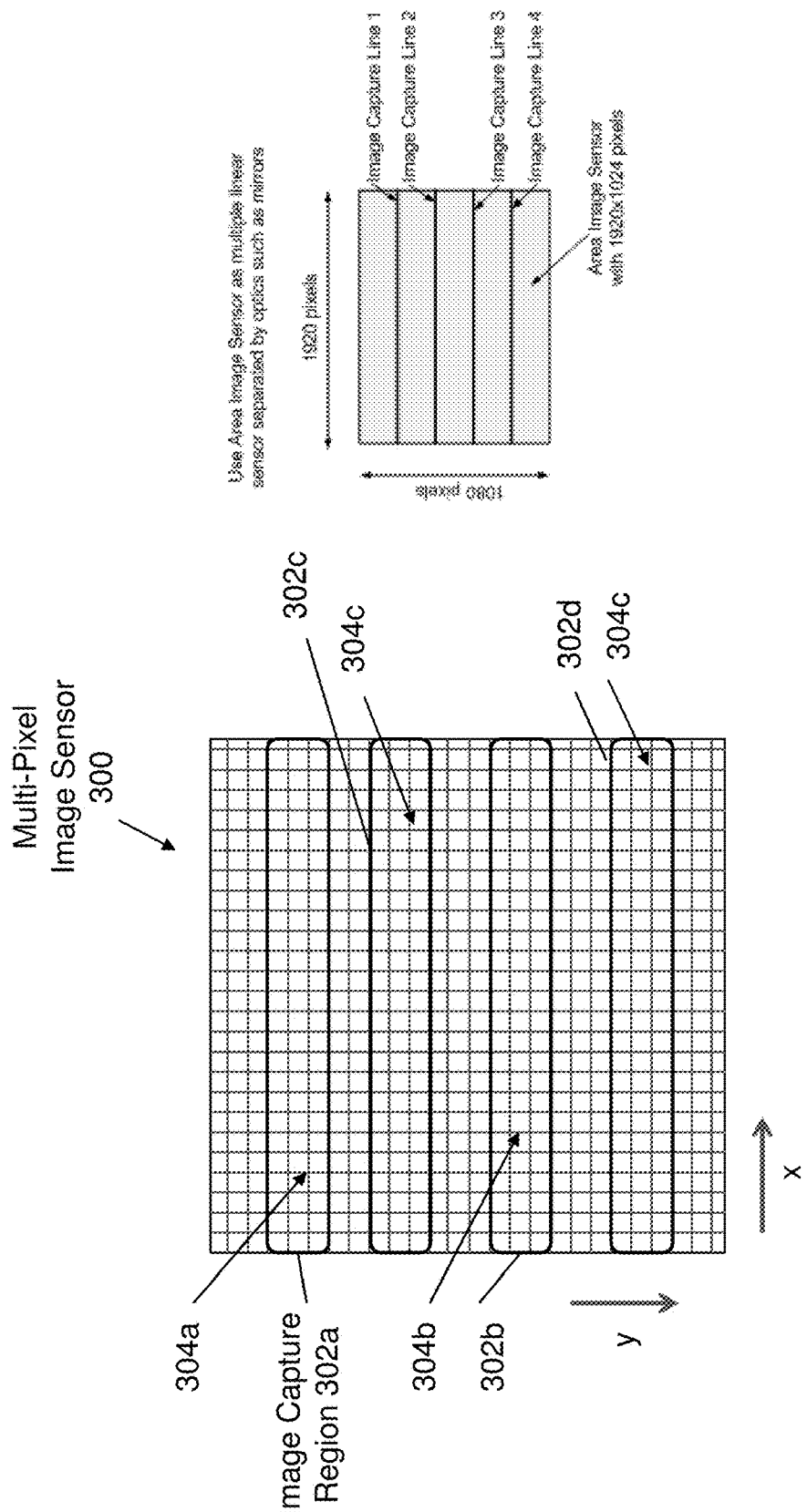
FIG. 3 is an illustration of an illustrative multi-pixel image sensor.

With regard to FIG. 3, an illustration of an illustrative multi-pixel image sensor 300 is shown. The image sensor 300 is shown to include a plurality of image capture regions 302a-302d (collectively 302) that illuminate corresponding subsets of imaging pixels 304a-304d (collectively 304). When image data captured by the subsets of imaging pixels 304 from these image capture regions 302 are stitched together, a complete image of an image scene, such as image scene 106 of FIG. 1, may be formed. The image capture regions 302 shown on the image sensor 300 are illustrative and in no particular arrangement. It should be understood that alternative arrangements and configurations may be utilized. In one embodiment, the size and shape of the image capture regions 302 are substantially identical (e.g., cover the same or substantially similar number of pixels). Alternative size and shapes of the image capture regions 302 may be utilized, but the same or substantially similar number of pixels along a single line or multiple lines of each of the image capture regions 302 may be utilized for stitching an image of the scene together. It should also be understood that the actual images that are illuminated on the image sensor 300 may vary and that sensor data from the subsets of pixels 304 being illuminated may be collected. Data captured by the subsets of pixels 304 may correspond to specific physical locations on the conveyor belt that may or may not be physically in line with one another, as shown in FIG. 4. Whether or not physically in line with one another, a calibration process may be performed to physically describe the physical positioning with respect to one of the line scans that operates as a reference line scan. The calibration may result in stitching parameters, such as position data of each scan area and/or scan line, that may be applied to captured image data for stitching the image data from the different subsets of imaging pixels.

Figures 4A, 4B:
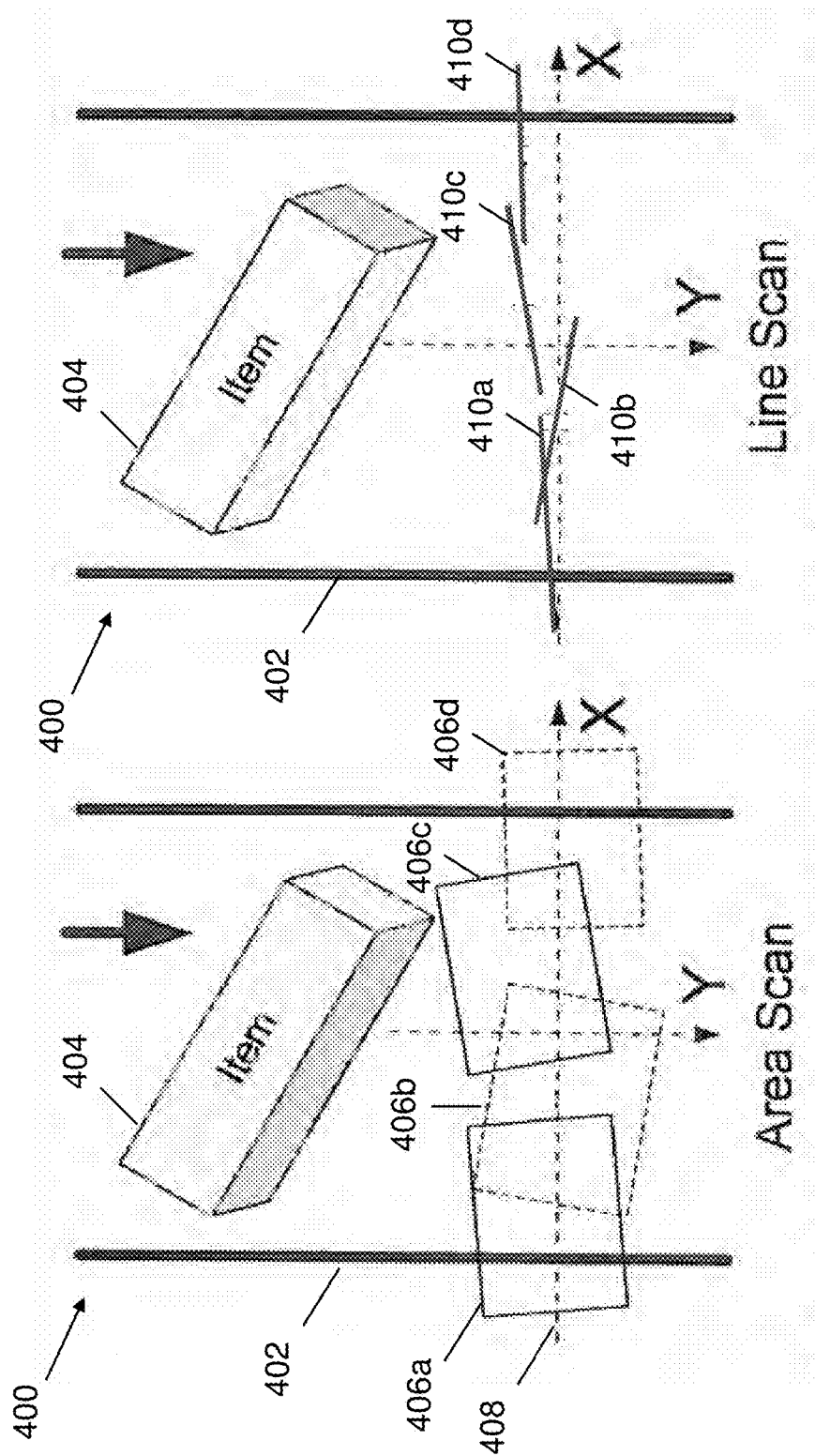
FIG. 4A is a scene shown to include a conveyor belt on which an object or item is positioned for movement along a y-axis so as to pass within scan areas for area scanning that are imaged by a camera with a two-dimensional (2D) image sensor, such as shown in FIG. 3.
FIG. 4B is an illustration of the scene of FIG. 4A used for line scanning

With regard to FIG. 4A, a scene 400 is shown to include a conveyor belt 402 on which an object or item 404 is positioned for movement along a y-axis so as to pass within scan areas 406a-406d (collectively 406) that are imaged by a camera with a two-dimensional (2D) image sensor, such as shown in FIG. 3. As shown, the scan areas 406 that are used for area scanning are misaligned, but overlap in such a manner that a line scan 408 along the x-axis is formed. It should be understood, however, that the scan areas 406 may not be aligned to form the single scan line 408, and that a single line scan may be constructed by offsetting the captured images of the scan areas 406 on one or more image sensors. The use of multiple scan areas 406 enables the use of an inexpensive camera as compared to a camera capable of scanning across the entire conveyor belt that may be 24 inches or wider with a sufficient resolution.

With regard to FIG. 4B, the scene 400 of FIG. 4A is shown. However, rather than using scan images to perform area scanning, line scans 410a-410d (collectively 410) that extend across the conveyor belt 402 may be used to perform line scanning. The line scans 410 are not in linear alignment with one another, and a stitching process may be used to linearly align the line scans 410. A calibration may be performed to determine relative positioning of the line scans 410 with regard to one another. The positioning may include linear (shift) alignment in both x- and y-axes, and angular rotation such that the image data captured from the scan lines 410 may be linearly aligned. The offsets may be used to form a linear image of the object 404, as captured by the non-linearly aligned line scans 410. The same or similar process may be used for the scan areas in FIG. 4A.

In addition to stitching parameters, including offsets (shift-X, shift-Y) and rotation of the scan areas 406 (FIG. 3A) and/or line scans 410 (FIG. 3B) being stored in lookup tables (see TABLE I as an example), other stitching parameters may be stored in the lookup tables. The other stitching parameters may include scale ratio and grayscale value. The scale ratio may be based on distance of the camera (i) from the surface of the conveyor belt 402 offset by a height (z-axis) of the items being imaged or (ii) from a top surface of the item 404 directly. The grayscale value may be a predetermined grayscale that is established by a calibration process. In one embodiment, the camera may be calibrated to a given white level utilizing any calibration process as understood in the art. In the case of using multiple cameras, grayscale levels may be different for each of the cameras. The grayscale value may calibrate one camera with respect to another camera, one image sensor with respect to another image sensor, and/or one subset of image pixels with respect to another subset of image pixels.

TABLE I

Lookup Table

| H (Height) mm | Shift-X pixels | Shift-Y pixels | Grayscale Ratio (X) | Scale Ratio | Rotation Degrees |
| --- | --- | --- | --- | --- | --- |
| 5 | | | | | |
| 10 | | | | | |
| 15 | | | | | |
| ... | | | | | |
| 455 | | | | | |
| 460 | | | | | |

Each set of line scans has a table relative to one of the line scans. As an example, if there are four line scans, then a first line scan (e.g., left-most line scan) may be a base line scan from which each of the other line scans have lookup tables with stitching parameters that are relative to the base line scan. In one embodiment, the stitching parameters are relative stitching parameters. In another embodiment, the stitching parameters are absolute stitching parameters from which relative distance, angle, etc., may be calculated. Shift-Y provides for additional to alignment by timestamp of a line image readout. The shift-Y may provide for offsetting distance of image data along the y-axis during the stitching process. Time stamps may be used if multiple cameras are used such that y-axis offsets may be determined for the Shift-Y parameter. The grayscale depends on the illumination of different optical views and may be compensated by software or lenses may be grouped and sorted in a similar effective focal length. Rotation angle may be minimized during manufacturing.

Figure 5:
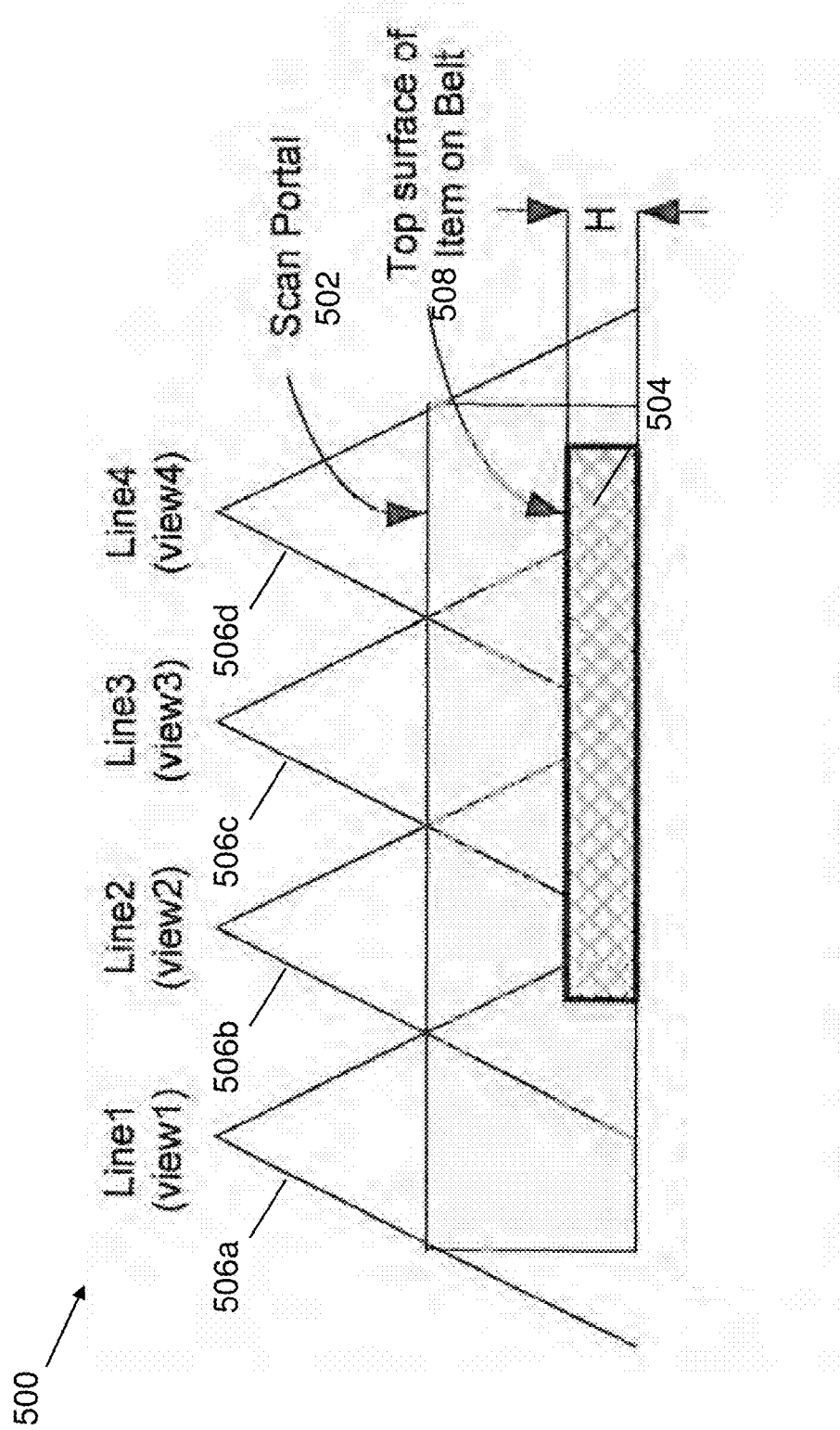
FIG. 5 is an illustration of an illustrative scanning system, including an imaging portal of an item or object being imaged by one or more cameras that use multiple scan lines, in this case four line scans.

With regard to FIG. 5, an illustration of an illustrative scanning system 500, including an imaging portal 502 of an item or object 504 being imaged by one or more cameras that use multiple scan lines 506a-506d (collectively 506), in this case four line scans. The line scans 506 may be established using optical devices to image a top surface 508 of the item 504. As the item 504 has a predetermined height H, the camera and line scans may be calibrated for the distance from the camera to the top surface 508. As shown, the line scans 506 are aligned to extend across the entire imaging portal 502, thereby allowing the item 504 to be positioned anywhere within the scan portal 502 and in any orientation. In this case, line scans 506b-506d completely image the top surface 508 of the item 504, so that images from these three line scans 506b-506d may be used for the imaging process. However, rather than performing image processing using image content captured by the three line scans 506b-506d, stitching of the image content captured by the three line scans 506b-506d may be performed by using data stored in three lookup tables associated with the three line scans 506b-506d.

As previously described, the data stored in the lookup table may be calibration data and include shift-X, shift-Y, grayscale, scale ratio, and rotation. The three lookup tables include stitching parameters or position data that, at least in part, describe physical relationships of the line scans 506 relative to one another. As an example, the data stored in the lookup tables for line scans 506b-506d may include offset data that defines relative physical position of each of the line scans 506b-506d on the conveyor belt or top surface of items being scanned relative to line scan 506a and, consequently, relative to one another. For purposes of this description, absolute position data provides for relative positioning data and is considered to be equivalent.

Figures 6A, 6B, 6C:
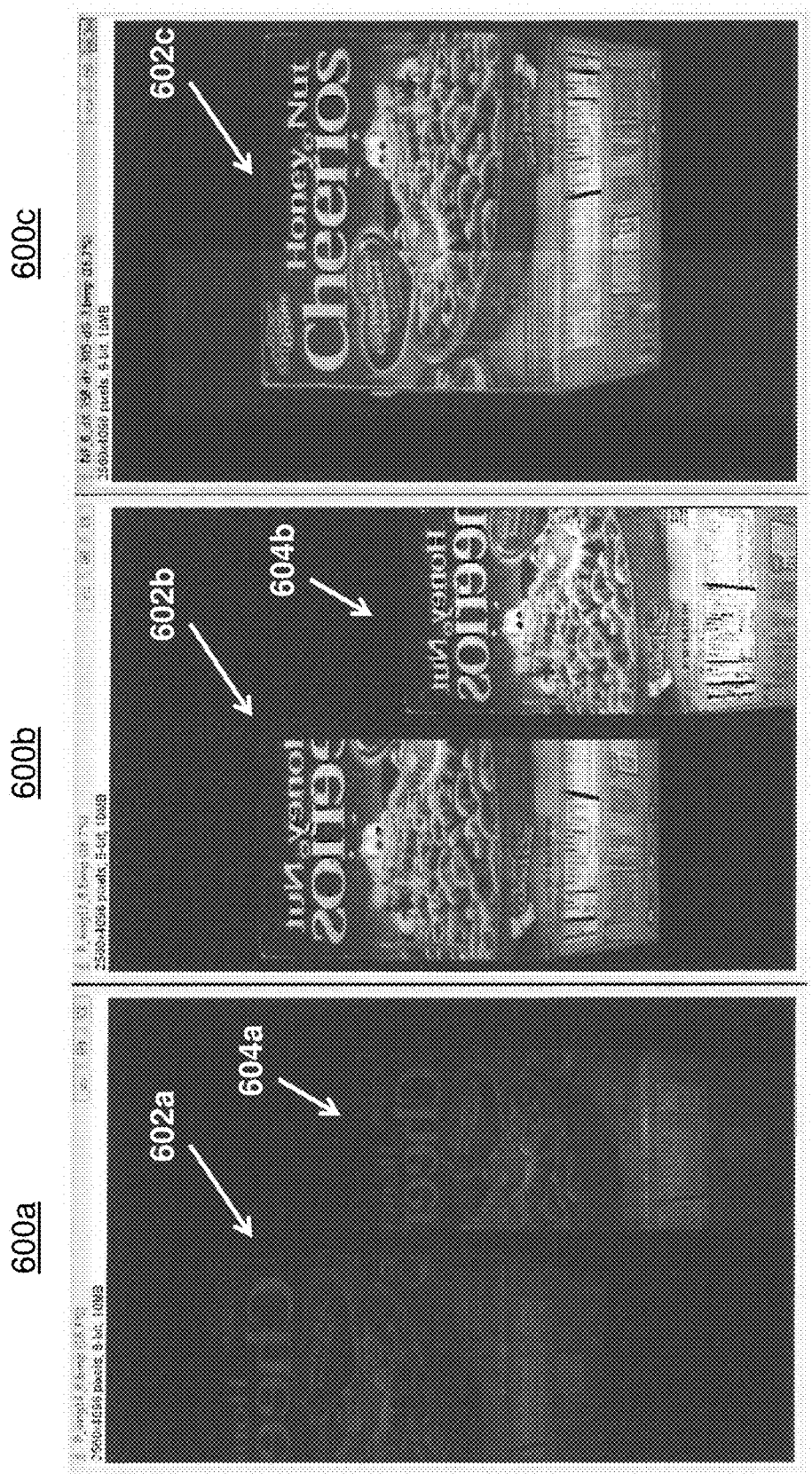
FIGS. 6A-6C are illustrations of an illustrative scanning and stitching process utilizing multiple cameras to capture image scans used to produce a stitched image.

With regard to FIGS. 6A-6C, illustrations of an illustrative scanning and stitching process 600a-600c utilizing multiple cameras to capture image scans 602a and 602b used to produce a stitched image 602c are shown. The image scans 602a and 602b may be captured by two cameras that are configured to capture a portion of a scene through which items are passed. In this case, a cereal box having a known height in the z-axis is scanned. If multiple cameras are used to capture a portion of the scene, then no additional optics elements may be used since the sub-scenes being captured by the respective cameras may be sized in a manner that sufficient resolution may be captured by each of the cameras. In an alternative embodiment, additional optical elements may be utilized to capture different sub-portions of the scene, as previously described. In this case, each of the cameras captures different aspects of a sub-portion of the scene. For example, and as shown, images 602a and 604a may be captured by a first camera by imaging the respective scene portions on different parts of an image sensor using optical elements, and images 602b and 604b may be captured by a second camera by imaging the respective scene portions on different parts of an image sensor using optical elements. The images 602a and 604a have different magnifications.

It can be seen that the grayscale levels of the first image scan 602a and of the second image scan 602b are different as a result of illumination and camera/image sensor differences. As previously described, the images may be captured using scan area imaging or line scan imaging, and lookup table(s) may be used to provide for stitching the image scans 602a and 602b (or image scans 604a and 604b) to form the stitched image 602c. As further previously described, rather than image processing the image data itself, relative position and orientation (angle) data may be stored in a lookup table that allows for the two image scans 602a and 602b to be stitched by aligning the image data captured by the respective cameras (or subset of pixels of the cameras) into a composite image (i.e., an image formed from all or some of the image data from the two image scans, in this case image scans 602a and 602b). In addition to offsetting one of the image scans 602b, for example, with respect to the other image scan 602a, grayscale levels may also be offset for the different image scans 602a and 602b.

With regard to FIGS. 7A-7C, illustrations of a verification process 700 show that the stitching process described herein operates without matching common imaged features. As shown, a first verification image 702*a* and a second verification image 702*b* illustrate a captured portion of an item (e.g., cereal box) may be captured with a center portion of an item being covered by a piece of paper. The first verification image 702*a* includes image data of a first portion 704*a* of the item and first center portion 706*a* covered by the paper. The second verification image 702*b* includes image data of a second portion 704*b* of the item and second center portion 706*b* covered by the paper. Because the center portions 706*a* and 706*b* are covered by the paper, no common imaged features of the item are available to process for stitching purposes. Hence, the stitching process is proven to rely completely on the use of lookup tables, which are defined from a calibration process in aligning line scan locations relative to one another, that are used to realign the first and second portions 704*a* and 704*b* of the item. FIG. 7C shows an illustrative composite image 702*c* inclusive of the first verification image 702*a* and second verification image 702*b*. The composite image 702*c* may be formed by offsetting the first verification image 702*a* relative to the second verification image 702*b*.

Figure 8:
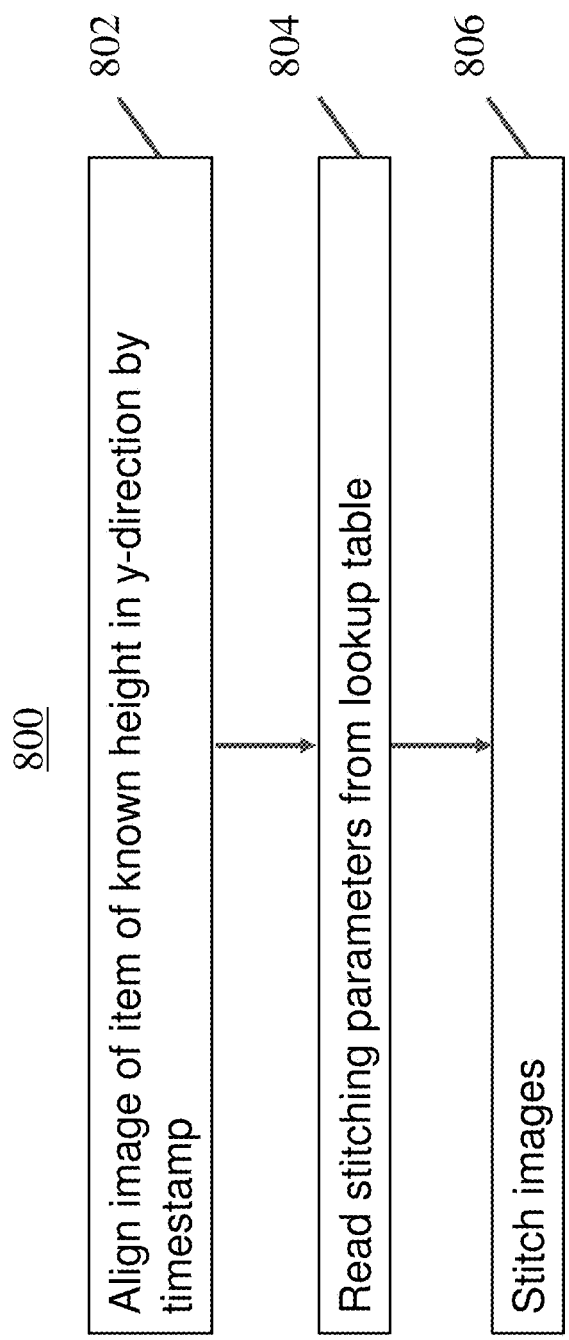
FIG. 8 is a flow diagram of an illustrative process for stitching images.

With regard to FIG. 8, a flow diagram of an illustrative process 800 for stitching images is shown. The process may be used for items of known height along a z-axis. The items may be moved along a conveyer belt or other mechanism that may be used to move the times. At step 802, images may be aligned in a y-axis direction by a timestamp. The images may be images of subsets of imaging pixels of one or more cameras. At step 804, stitching parameters may be loaded from a lookup table. Using the stitching parameters, the images may be adjusted and stitched together to form a composite image. In adjusting the images, each of the images may be rotated and moved along the x-axis and y-axis. As previously described, the stitching parameters may be position data of a scan area or line scan relative to a reference scan area or line scan.

Figure 9:
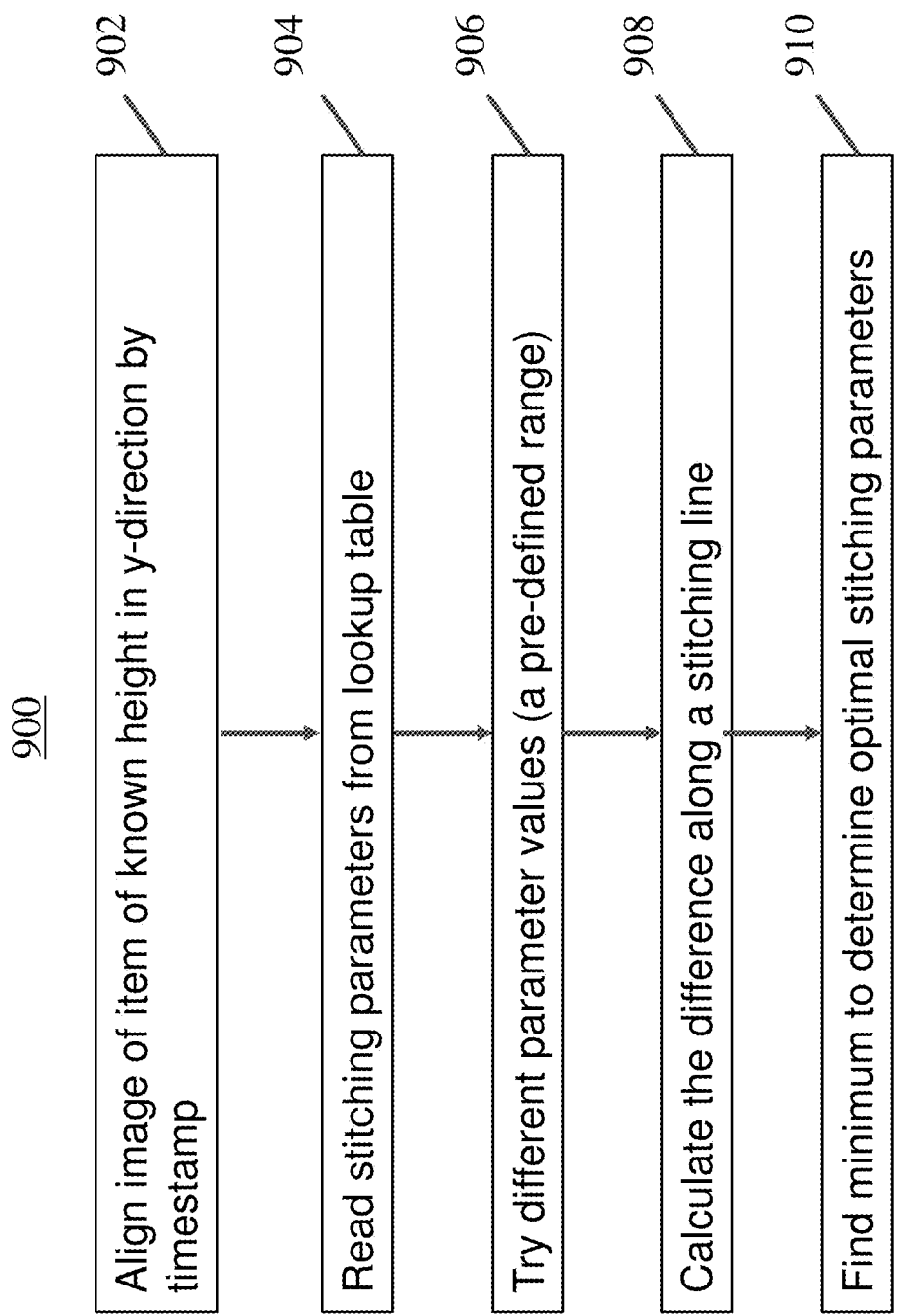
FIG. 9 is a flow diagram of an illustrative process for stitching images.

With regard to FIG. 9, a flow diagram of an illustrative process 900 for stitching images is shown. The process may be used for items of known height along a z-axis. The items may be moved along a conveyer belt or other mechanism that may be used to move the times. At step 902, images may be aligned in a y-axis direction by a timestamp. The images may be images of subsets of imaging pixels of one or more cameras. At step 904, stitching parameters may be loaded from a lookup table. At step 906, a pre-defined range of different parameter values may be tried. The predefined range is based on calibration, such as lookup table data+/−10 pixels in X and Y shifts. At step 908, a difference along a stitching line may be calculated. At step 910, a minimum may be found to determine optimal stitching parameters.

Figure 10:
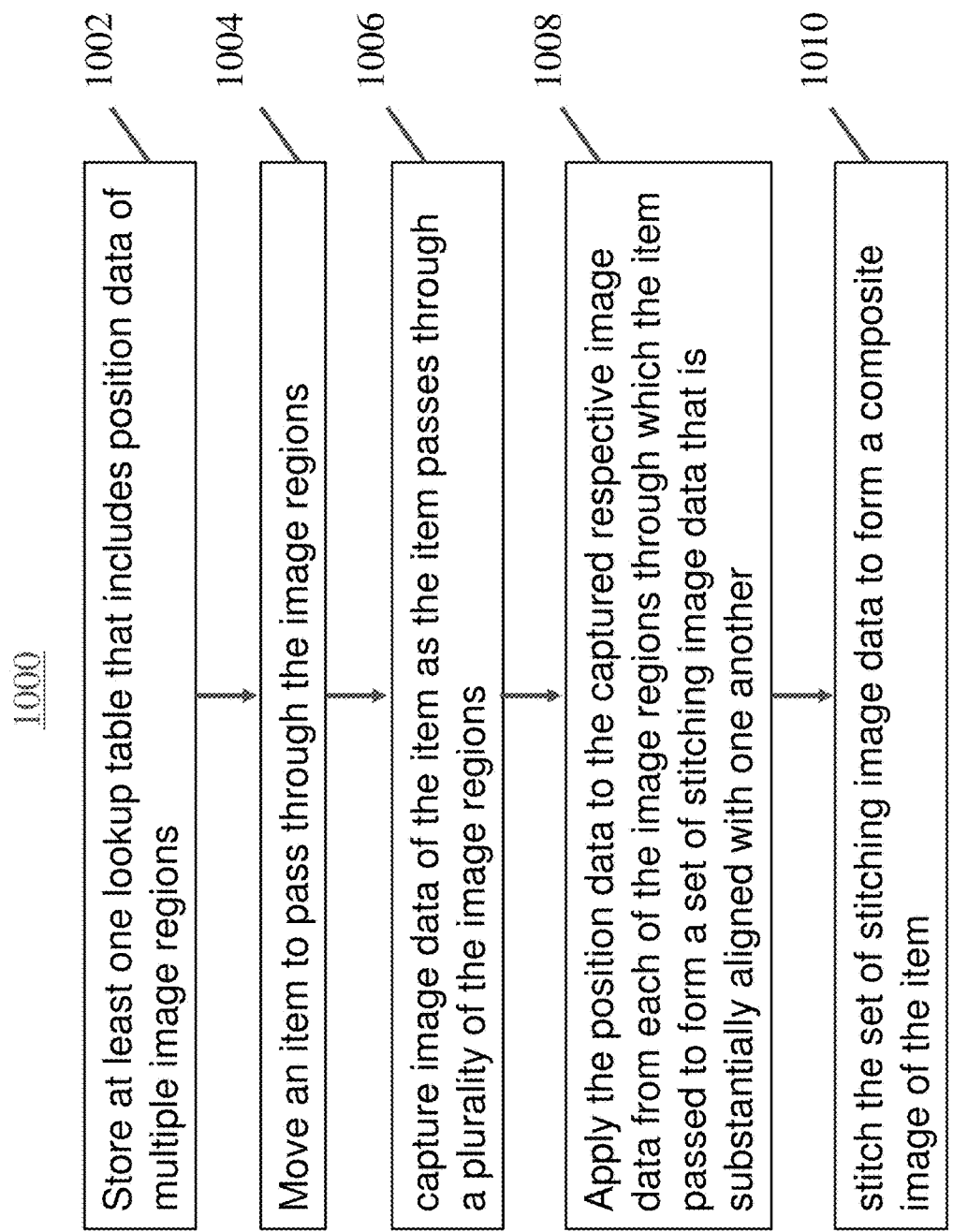
FIG. 10 is a flow diagram of an illustrative process for imaging an item with known height along a z-axis.

With regard to FIG. 10, a flow diagram of an illustrative process for imaging an item with known height along a z-axis is shown. The process 1000 may start at step 1002, where at least one lookup table that includes position data of multiple image regions may be stored. The position data may provide relative positions of the image regions. The image regions may be scan areas or scan lines. The image regions may be imaged onto one or more pixel sensors. The relative positions may include position offsets from a reference image region. At step 1004, an item may be moved to pass through the image regions. The item may be moved using a conveyer belt, for example. At step 1006, image data of the item may be captured as the item passes through a plurality of the image regions. At step 1008, the position data may be applied to the captured respective image data from each of the image regions through which the item passed to form a set of stitching image data that is substantially aligned with one another. In being substantially aligned, the alignment may be across a linear scan line across the y-axis (and along the x-axis) as a result of the individual scan lines (or scan areas) being offset and, optionally, rotated. At step 1010, the set of stitching image data may be stitched to form a composite image of the item.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A system for imaging items, said system comprising:
   a camera including a plurality of imaging pixels;
   at least one optical element configured and positioned to cause at least two subsets of the imaging pixels to capture respective image regions;
   a conveyer belt configured to move an item in front of said camera;
   a non-transitory memory configured to store at least one lookup table that includes position data of the image regions, the position data providing relative positions of the image regions;
   a processor in communication with said camera and said non-transitory memory, and programmed to:
     capture image data of an item from each of the subsets of imaging pixels;
     apply the position data to the captured respective image data from each of the respective subsets of imaging pixels to form a set of stitching image data that is substantially aligned with one another; and
     stitch the set of stitching image data to form a composite image of the item.

2. The system according to claim 1, wherein the at least one lookup table includes a distinct lookup table associated with each subset of imaging pixels.

3. The system according to claim 1, wherein the at least one lookup table includes shift-X, shift-Y, and rotational data elements that define relative position and angular rotation of the captured image data from a first subset of imaging pixels relative to other captured image data from a second subset of imaging pixels.

4. The system according to claim 3, wherein the at least one lookup table further includes a scale ratio data element.

5. The system according to claim 3, wherein the at least one lookup table further includes a grayscale ratio data element.

6. The system according to claim 5, wherein said processor is further configured to apply the grayscale ratio data element to the captured image data by the respective at least one subset of imaging pixels.

7. The system according to claim 1, wherein said processor, in applying the position data to the captured image data from each of the respective subsets of imaging pixels, is configured to apply the position data to all but one of the captured image data.

8. The system according to claim 1, wherein said processor is further configured to calibrate the at least two subsets of the imaging pixels including populating the at least one lookup table with the position data.

9. The system accorded claim 1, wherein said system includes a plurality of cameras including a plurality of imaging pixels, and wherein the at least one lookup table includes position data for at least one subset of imaging pixels of each of the cameras.

10. The system according to claim 1, wherein the at least one lookup table include a grayscale value used to adjust grayscale levels of captured image data by imaging pixels of a respective camera.

11. A method for imaging items, said method comprising:
    storing at least one lookup table that includes position data of multiple image regions, the position data providing relative positions of the image regions;
    moving an item to pass through the image regions;
    capturing image data of the item as the item passes through a plurality of the image regions;
    applying the position data to the captured respective image data from each of the image regions through which the item passed to form a set of stitching image data that is substantially aligned with one another; and
    stitching the set of stitching image data to form a composite image of the item.

12. The method according to claim 11, wherein storing the at least one lookup table includes storing a distinct lookup table associated with each subset of imaging pixels.

13. The method according to claim 11, wherein storing the at least one lookup table includes storing shift-X, shift-Y, and rotational data elements that define relative position and angular rotation of the captured image data from a first subset of imaging pixels relative to other captured image data from a second subset of imaging pixels.

14. The method according to claim 13, wherein storing the at least one lookup table includes storing a scale ratio data element in the at least one lookup table.

15. The method according to claim 13, wherein storing the at least one lookup table further includes storing a grayscale ratio data element in the at least one lookup table.

16. The method according to claim 15, further comprising applying the grayscale ratio data element to the captured image data by the respective at least one subset of imaging pixels.

17. The method according to claim 11, wherein applying the position data to the captured respective image data includes apply the position data to all but one of the captured image data.

18. The method according to claim 11, further comprising calibrating by populating the at least one lookup table with the position data.

19. The method accorded claim 11, wherein storing the at least one lookup table includes storing the at least one lookup table in relation to respective multiple cameras configured to image the image regions.

20. The method according to claim 11, wherein storing the at least one lookup table includes storing a grayscale value used to adjust grayscale levels of captured image data.

* * * * *